United States Patent [19]

Hatfield et al.

[11] 4,278,788

[45] Jul. 14, 1981

[54] REMOVAL OF RESIDUAL CATALYST FROM POLYOLEFIN POLYMERS

[75] Inventors: James R. Hatfield; Merlin H. Moseman, both of Omaha, Nebr.; James R. Graham, Fountain Valley, Calif.; Thomas J. Hirt, Omaha, Nebr.

[73] Assignee: InterNorth, Inc., Omaha, Nebr.

[21] Appl. No.: 21,097

[22] Filed: Mar. 16, 1979

[51] Int. Cl.$^3$ ............................ C08F 6/02; C08F 6/08
[52] U.S. Cl. ................................ 528/494; 260/348.18; 422/139; 528/483; 528/495; 528/496; 528/499
[58] Field of Search ................ 528/483, 488, 489, 494

[56] References Cited

U.S. PATENT DOCUMENTS

| | | | |
|---|---|---|---|
| 3,644,321 | 2/1972 | Koga | 528/486 X |
| 4,117,219 | 9/1978 | Kakogawa | 528/494 |

Primary Examiner—C. A. Henderson
Attorney, Agent, or Firm—Donald F. Haas

[57] ABSTRACT

An improved method for reducing the halogen content of a particulate polyolefin formed by catalytic polymerization of an olefin in the presence of a Ziegler-Natta catalyst is taught which comprises the steps of causing the polyolefin in the dry state to flow into a gas phase fluidized bed, contacting the polyolefin in the fluidized bed with a gas comprising 0.05% to 0.2% alkylene oxide, 5% to 30% water, and the balance inert gas such that the alkylene oxide reacts with halogens present in the polyolefin to form an alkylene halohydrin, removing the alkylene halohydrin from the fluidized bed and thus reducing the halogen content of the polyolefin. The improvement comprises regenerating the alkylene oxide by contacting the inert gas containing alkylene halohydrin with a caustic solution in alcohol or water and recovering therefrom alkylene oxide formed by the reaction of the alkylene halohydrin and the caustic solution.

6 Claims, No Drawings

REMOVAL OF RESIDUAL CATALYST FROM POLYOLEFIN POLYMERS

BACKGROUND OF THE INVENTION

The present invention relates to a method of reducing the halogen content in a particulate polyolefin formed by catalytic polymerization of an olefin in the presence of a Ziegler-Natta catalyst by subjecting the particulate polyolefin to a purifying treatment involving passage of gas therethrough.

In the polymerization of olefins using Ziegler-Natta catalysts, the particulate polyolefins usually obtained have a certain content of catalyst components depending upon the catalyst combination used and the polymerization conditions employed. Thus, in virtually all polyolefins of this kind there is a relatively high content of halogen, particularly chlorine. This means that the polyolefins must be treated to reduce the halogen content before they are further processed, as otherwise they would produce relatively severe corrosion in the machines used for converting the polyolefins. The presence of halogens also has a detrimental effect on the properties of the products made with polyolefins.

There are several well-known methods for reducing the catalyst and halogen contents of these polyolefins. On such method comprises dissolving the polyolefins, hydrolyzing and precipitating the catalyst components, filtering this system, and reprecipitating the polyolefins from the filtering solution. Another method consists of treating the particulate polyolefins with specific wash liquids. The third method involves the treatment of the particulate polyolefins with aqueous/alkaline solutions or sulfoxide in extruders. One highly effective extruder method is disclosed in U.S. Pat. No. 3,925,341 to Mueller-Tamm, Schick, Rau, and Hennenberger. This method involves treating the polyolefin with an alkylene oxide and water in an extruder. The halogen content is converted to alkylene halohydrin which is sufficiently volatile that it can be easily separated from the polyolefin.

Still another method for reducing the halogen content is the gas phase fluidized bed dechlorination method such as described in British Pat. No. 1,420,837 to Badische Anilin and Soda-Fabrik Aktiengesellschaft. According to that patent, particulate polyolefins are subjected to a purifying treatment involving the passage of gas therethrough, wherein the purifying treatment is carried out in a gas phase fluidized bed and the purifying gas used comprises a mixture of nitrogen, steam, and an alkylene oxide in a particular ratio. It is said therein that the method can reduce the halogen content to about 20 parts per million and it has been found that further modifications of the method can reduce the halogen content even further.

Significant amounts of alkylene oxide are consumed in the above method. Therefore, it definitely would be advantageous from a cost standpoint to recover as much of the alkylene oxide as is possible. It is well known that alkylene halohydrins can be converted to alkylene oxides by treating the halohydrins with caustic solutions. Indeed, there are a number of old industrial processes for manufacturing ethylene oxide from ethylene chlorohydrin. Those processes all utilize relatively highly concentrated solutions of ethylene chlorohydrin to produce ethylene oxide.

U.S. Pat. No. 1,446,872 to Brooks discloses a method for making ethylene oxide from ethylene chlorohydrin by reacting the chlorohydrin with a caustic alkali in the presence of as little water as possible. The patentee states that when the reaction is carried out in the presence of considerable water, very poor yields of oxide result. The patentee states that one part by weight of a solution containing 80% chlorohydrin and 20% water and 1 part by weight of solid caustic soda reacted together will produce the maximum theoretically possible yield of ethylene oxide. U.S. Pat. No. 3,886,187 to Bartholome, Koehler, Stoeckelmann, and May discloses a process for the continuous manufacture of propylene oxide by turbulent jet mixing of a propylene chlorohydrin solution with aqueous alkali, mixing with steam to produce a two-phase mixture and a special working-up process following turbulent passage through a reaction zone with a short residence time. It is said that propylene oxide is obtained in high yield and high space-time yield. The patentees state that the alkaline components are generally used in concentrations from 2 to 15 moles per liter of solution.

In the fluidized bed dehalogenation process, the concentration of alkylene halohydrin in the gas stream which is removed by volatization from the fluidized bed is very small. It has been found that when dilute solutions of alkylene halohydrin are treated with relatively highly concentrated caustic solutions such as those disclosed in U.S. Pat. Nos. 1,446,872 and 3,886,187 above, the reaction conditions favor the production of an undesirable amount of alkylene glycol rather than alkylene oxide. Aside from the fact that the production of oxide is preferred so that it can be recycled into the fluidized bed, the presence of glycol causes undesirable foaming which adversely affects the operation of the caustic scrubber where the halohydrin is contacted with the caustic solution. It has been unexpectedly found that by treating the dilute halohydrin solutions with dilute caustic solutions, the production of alkylene oxide can be maximized and the production of glycol and the foaming problems concurrent therewith can be minimized.

Therefore, it is an object of this invention to regenerate alkylene oxide so that it can be recycled to the fluidized bed dehalogenation apparatus. It also is an object of this invention to maximize the production of alkylene oxide in the caustic scrubber and thereby minimize the production of alkylene glycol therein. A further object of this invention is to minimize or eliminate foaming in the caustic scrubber.

SUMMARY OF THE INVENTION

The present invention relates to an improved method for reducing the halogen content of a particulate polyolefin formed by catalytic polymerization of an olefin in the presence of a Ziegler-Natta catalyst. This method comprises the steps of:

(a) causing the polyolefin in a dry state to flow into a gas phase fluidized bed, (b) contacting the polyolefin at elevated temperature in the fluidized bed with a gas comprising 0.05% to 0.2% alkylene oxide, 5% to 30% solvent, and the balance inert gas, preferably nitrogen, such that the alkylene oxide reacts with halogens present in the polyolefin to form alkylene halohydrin, (c) removing the alkylene halohydrin from the fluidized bed thereby reducing the halogen content of the polyolefin, (d) contacting the alkylene halohydrin with a caustic solution at a temperature of from 90° F. (32° C.) to 160° F. (71° C.), wherein the solvent is selected from the group consisting of alcohol and water and the concentration of the caustic is from 0.001 N to 1 N. and (e) recovering alkylene oxide formed by the reaction of the alkylene halohydrin and the caustic solution.

The above-described method is particularly useful for reducing the halogen content of crystalline polypropylene. The preferred alkylene oxides for use in the present invention are ethylene oxide and propylene oxide. The preferred caustics for use in the present invention are selected from the group consisting of potassium hydroxide, sodium hydroxide, and calcium hydroxide.

The method of the present invention is particularly useful in producing alkylene oxides from dilute solutions of alkylene halohydrins. The gas stream leaving the fluidized bed contains only a very small concentration of alkylene halohydrin, most commonly in the range of from 50 ppm to 300 ppm. It has been found that only dilute caustic solutions can be used to regenerate alkylene oxide under these conditions because with higher concentrations of caustic an undesirable amount of alkylene glycol is formed and foaming occurs in the caustic scrubber. The method of the present invention can be utilized apart from the fluidized bed dehalogenation method described above.

DETAILED DESCRIPTION OF THE INVENTION

The particulate polyolefin, preferably polypropylene, is fed into a multi-stage agitated powder fluid bed system. The fluid bed can be operated in either batch or continuous mode. If it is operated in batch, no preheating of the polyolefin is necessary. However, if the fluid bed is operated continuously, it is desirable that the first section of the fluid bed be a preheating section. It is important that the internal system remain as close to adiabatic as possible. This can be accomplished either by a combination of insulation and heating applied to the external surface or by insulation alone.

The temperature in the fluidized bed is maintained in the range from 190° F. (88° C.) to 250° F. (121° C.) with the optimum temperature being about 230° F. (110° C.). If a temperature of less than 190° F. (88° C.) is used in the fluid bed system, an abnormally long residence time is required for dehalogenation. If temperatures too close to the melting point or softening point of the polyolefin are used, fouling of the fluid bed system can occur.

In general, the method of the treatment of the particulate polyolefins by gases flowing therethrough in the fluidized bed may be carried out in any conventional manner using any conventional apparatus for such gas phase fluidized bed processes. For instance, the inlet gas may be bubbled up through the powder from the bottom of the fluidized bed. The inlet gas should contain from 0.05% to 0.2% of an alkylene oxide, preferably ethylene oxide or propylene oxide. If the concentration of the alkylene oxide is allowed to go below 0.05%, the result is either an incomplete reaction or an abnormally long residence time in the bed before complete dehalogenation occurs. The moisture concentration in the inlet gas should be from 5% to 30%, with approximately 10% being the ideal concentration. The moisture concentration in the fluidized bed has a two-fold effect. First, it is necessary for the reaction of the residual halogen-containing Ziegler-Natta catalyst with the alkylene oxide to form alkylene halohydrin. It is theorized that the moisture reacts with active chlorine in the powder to form hydrochloric acid which then reacts with the alkylene oxide to form alkylene halohydrin. Second, it is necessary for adequate control of static electricity which can greatly inhibit the handling of particulate polyolefins. The remainder of the inlet gas should be comprised of an inert gas, preferably nitrogen, but only because of its availability and low cost.

The rate of gas load per unit weight of polyolefin may be varied within wide limits. In general, the rate is greater for polyolefins having a high original halogen content and also when the halogen content is to be reduced to a great extent and the gas has a low concentration of moisture or alkylene oxide. Superficial gas velocities in the fluidized bed are most appropriate at approximately 1½ times the minimum fluidization velocities. The flow of the inlet gas through the powder and out of the top of the fluidized bed carries with it the relatively highly volatile alkylene halohydrin and thus most of the halogen content of the particulate polyolefin is removed.

The regeneration and recycling of the alkylene oxide are accomplished by contacting the effluent gases from the fluidized bed, which contain alkylene halohydrin, with a caustic solution. The amount of alkylene halohydrin which is contained within the effluent gases stream is quite small. The concentration usually varies from 50 ppm to about 300 ppm. The contacting may be accomplished by any suitable contactor for the intimate mixing of gas and liquid streams.

The effluent gases are preferably passed through a countercurrent packed bed caustic scrubber column where they come in intimate contact with a dilute caustic solution. The packing in the column may be any conventional packing for use in such columns, such as pall rings, Intalax ® saddles, Berl saddles, and Raschig rings. Flow redistributors in the column may be used to prevent the solution from running down the inside surfaces of the column. The solvent for the caustic solution may be either water or an alcohol with volatility such that the alkylene oxide recycle stream leaving the scrubber column contains 5% to 30% vaporized alcohol. Alcohols which fit this description include n-butyl, sec-butyl, isobutyl, and t-amyl alcohols as well as 2-pentanol. Conventional caustics such as sodium hydroxide, potassium hydroxide, and calcium hydroxide may be used in the caustic scrubber in a concentration of from about 0.001 N to about 1 N. The preferred concentration for the caustic is 0.01 N to 0.1 N and the optimum appears to be approximately 0.04 N.

If the concentration of the caustic is less than 0.001 N, then the reaction of alkylene halohydrin to alkylene oxide is incomplete. Increasing the caustic concentration up to and above 1 N results in some improvement in the conversion of alkylene halohydrin to alkylene oxide but greatly increases the losses of alkylene oxide to alkylene glycol. The rates of reaction of alkylene halohydrin to alkylene oxide and alkylene oxide to alkylene glycol are both dependent upon the hydroxide ion concentration. Use of low hydroxide ion concentrations allow one to control the reactions in the scrubber so that the conversion of alkylene oxide to alkylene glycol proceeds slowly, preventing the loss of the desired alkylene oxide. If the hydroxide concentration and the residence time are kept low, the production of alkylene oxide will be maximized.

The temperature in the caustic scrubber column can range from about 90° F. (32° C.) to about 160° F. (71°

C.). At temperatures below 90° F. (32° C.), the moisture concentration in the fluid bed is so low that static electricity becomes a problem. The optimum temperature for the column is approximately 110° F. (43° C.) when water is used as the solvent. The temperature of the scrubber column, as well as having a distinct effect upon the reaction of alkylene halohydrin to alkylene oxide or the undesirable alkylene glycol, also controls the moisture concentration of the inlet gas to the fluidized bed after recycle from the scrubber column. The temperature of the scrubber column is used as the primary humidification control in the system. A temperature of 100° F. (38° C.) corresponds to approximately 9% moisture in the inlet gas to the fluidized bed depending upon the system pressure. The upper temperature limit is optional depending upon how much moisture is desired in the system. At higher column temperatures, water will condense in the cooler areas of the system and cause corrosion problems. A higher scrubber column temperature provides higher moisture concentrations but also causes a higher percentage of alkylene oxide in the scrubber to be converted to alkylene glycol. This, of course, is undesirable because less alkylene oxide is produced for recycle to the fluid bed. In addition, the tolerance of the scrubber column to the resulting alkylene glycol is much less and foaming becomes a serious problem at elevated temperatures. Foaming occurs as a result of bubbles of the inert gas forming and rising to the liquid surface in a liquid whose viscosity prevents displacement of the bubble wall and its rupture. Foaming does not occur as a result of alkylene glycol formed in any one pass through the system, but rather as a result of a build-up in the solvent which is constantly recycled throughout the system.

Propylene oxide is the preferred alkylene oxide for use in the present invention because it is less toxic than some other alkylene oxides as is its glycol. Ethylene oxide is also advantageous because it is relatively inexpensive. Nitrogen is the preferred inert gas because of its availability and low cost. Potassium hydroxide and sodium hydroxide are also preferred for their availability and relatively low cost.

As stated above, the solvent for the caustic for the scrubber column may be either water or alcohol. The use of alcohol provides the additional advantage that no alkylene glycol is produced and consequently there is no problem of foaming in the scrubber column. However, only alcohols with a volatility such that the alkylene oxide recycle stream leaving the scrubber column contains 5% to 30% vaporized alcohol may be used in this invention because if the volatility is too low the concentration of alcohol in the recycle stream will be less than 5% and if it is too high, the concentration will be more than 30%.

The variables discussed above may be adjusted to make the process work with different column sizes and gas flow rates. Such adjustments are within the expertise of skilled engineers.

EXAMPLE I

Polypropylene powder is fed into a multi-stage ebullient fluidized bed from a powder hopper through a feeder. The bed is divided into five sections, a preheating section which is 6¾ inches long and 4 inches deep, and 4 sections in the reaction zone which are each 4 inches long and 4 inches deep. The bed is 5 feet high and has a 1½ foot overhead volume expansion zone. The powder enters the fluid bed near the top and enters the preheating zone which is held at a temperature of 230° F. (110° C.). The purpose of the preheating zone is to heat the powder for faster reaction of chlorine and propylene oxide to propylene chlorohydrin. The temperature in the remainder of the fluid bed is held at 230° F. (110° C.) by use of external insulation and heating on the external surface. The depth of powder in the fluid bed is maintained at 4 feet in the preheating zone and 2½ feet in the reaction zone. The residence time of the powder in the bed is 50 minutes.

A gas stream comprising 89.9% nitrogen, 10% water, and 0.1% propylene oxide enters the fluid bed at the bottom through numerous apertures. The gas is heated to a temperature of 240° F. (116° C.) prior to its introduction into the fluid bed. The gas flow through the fluid bed is 24.4 cubic feet per minute.

The effluent gases containing propylene chlorohydrin, which has been formed by the reaction of propylene oxide and chlorine in the propylene powder, exit at the top of the fluidized bed. This gas stream is filtered and sent to a caustic scrubbing column. The effluent gas stream contains 75 ppm propylene chlorohydrin.

The caustic scrubber column is a 6-inch normal diameter, 15-foot vertical tower packed with 1-inch ceramic Super Intalox ® saddles and having ring-shaped flow redistributors spaced at 3¾ feet. The caustic solution in the column is a solution of potassium hydroxide in water at a concentration of 0.04 N. The temperature of the column is maintained at approximately 110° F. (43° C.). The effluent gas stream from the fluid bed flows into the bottom of the column and the caustic solution flows in at the top of the column. The gas stream exiting from the top of the scrubber column contains 0.1% propylene oxide and is recycled to the gas inlet of the fluid bed. Only 25 ppm/hour of propylene glycol is produced in the scrubber column and very little foaming occurs.

The chlorine content of the polypropylene powder is reduced from 400 parts per million to 50 parts per million. Almost all of the propylene oxide which is fed into the fluid bed is recovered in the gas outlet stream of the caustic scrubbing column.

EXAMPLE II

The procedure of Example I is repeated under the following conditions:
Fluid bed preheating zone temperature—216° F. (102° C.)
Fluid bed reaction zone temperature—221° F. (105° C.)
Fluid bed powder depth—3 feet (all sections)
Powder residence time—52 minutes
Inlet gas stream composition—7.5% isobutyl alcohol, 0.1% propylene oxide, 92.4% nitrogen
Inlet gas stream temperature—252° F. (122° C.)
Gas flow—26.2 cubic feet per minute.
Propylene chlorohydrin concentration in effluent gas stream—less than 75 ppm
Caustic solution—0.04 N potassium hydroxide in isobutyl alcohol
Scrubbing column temperature—124° F. (51° C.)

The chlorine content of the polypropylene powder is reduced from 358 ppm to 85 ppm. No propylene glycol forms and there is no foaming because there is no water in the system.

EXAMPLES III-V 30 milliliters per minute of a 0.004 N solution of sodium hydroxide in water flows downwardly through a 2-foot high scrubber column packed with less than ¼-inch crushed ceramic saddles. 0.136 cubic feet per minute of nitrogen containing propylene chlorohydrin is bubbled upwardly through the column. The temperature is measured at the liquid inlet ($T_1$), one inch down from the liquid inlet ($T_2$), one inch up from the gas inlet ($T_3$), and three inches up from the gas inlet ($T_4$). The inlet and outlet concentrations of the gas stream are measured to determine the conversion of propylene chlorohydrin (PCH) to propylene oxide (PO). The following Table A shows the result for three different sets of temperatures.

TABLE A

|  | $T_1$ (°F.) | $T_2$ (°F.) | $T_3$ (°F.) | $T_4$ (°F.) | PCH in (ppm) | PO out (ppm) | PCH out (ppm) |
| --- | --- | --- | --- | --- | --- | --- | --- |
| Ex. III | 95 (35° C.) | 94 (34° C.) | 85 (29° C.) | 87 (31° C.) | 74 | 11 | 8 |
| Ex. IV | 115 (46° C.) | 115 (46° C.) | 119 (48° C.) | 124 (51° C.) | 81 | 56 | — |
| Ex. V | 155 (68° C.) | 156 (69° C.) | 122 (50° C.) | 137 (58° C.) | 180 | 93 | 9 |

The results indicate that the conversion of propylene chlorohydrin to propylene oxide proceeds reasonably well at this low caustic concentration and that it is better at higher temperatures.

EXAMPLES VI–IX

The procedure of Example III is repeated with a 0.047 N solution of sodium hydroxide in water flowing into the column at a rate of 30 milliliters per minute. The gas stream flows at 0.116 cubic feet per minute. The results are set out in Table B.

TABLE B

|  | $T_1$ (°F.) | $T_2$ (°F.) | $T_3$ (°F.) | $T_4$ (°F.) | PCH in (ppm) | PO out (ppm) | PCH out (ppm) |
| --- | --- | --- | --- | --- | --- | --- | --- |
| Ex. VI | 85 (29° C.) | 85 (29° C.) | 84 (29° C.) | 85 (29° C.) | 146 | 45 | 7 |
| Ex. VII | 109 (43° C.) | 109 (43° C.) | 104 (40° C.) | 109 (43° C.) | 143 | 85 | 6 |
| Ex. VIII | 147 (64° C.) | 150 (66° C.) | 124 (51° C.) | 136 (58° C.) | 164 | 155 | 6 |
| Ex. IX | 158 (70° C.) | 160 (71° C.) | 129 (54° C.) | 141 (61° C.) | 198 | 141 | — |

The results indicate that the conversion is very good at this concentration, especially at the higher temperatures.

EXAMPLES X–XII

The procedure of Example III is repeated with a 0.4 N solution of sodium hydroxide in water flowing at 36 milliliters per minute. The gas stream flows at 0.124 cubic feet per minute. The results are set out in Table C.

TABLE C

|  | $T_1$ (°F.) | $T_2$ (°F.) | $T_3$ (°F.) | $T_4$ (°F.) | PCH in (ppm) | PO out (ppm) | PCH out (ppm) |
| --- | --- | --- | --- | --- | --- | --- | --- |
| Ex. X | 97 (36° C.) | 97 (36° C.) | 92 (33° C.) | 95 (35° C.) | 155 | 93 | 6 |
| Ex. XI | 114 (46° C.) | 114 (46° C.) | 113 (45° C.) | 114 (46° C.) | 229 | 218 | — |
| Ex. XII | 150 (66° C.) | 155 (68° C.) | 126 (52° C.) | 140 (60° C.) | 155 | 158 | — |

The results show that the conversion proceeds very well at this high concentration. This experiment is not operated at conditions which will produce foaming since it occurs only after the concentration of propylene glycol in the recycled water builds up over a period of time.

What is claimed is:

1. In a method for reducing the halogen content of a particulate polyolefin formed by catalytic polymerization of an olefin in the presence of a Ziegler-Natta catalyst, wherein the polyolefin in the dry state is contacted at elevated temperature in a gas phase fluidized bed with an inert gas stream containing alkylene oxide and a solvent selected from the group consisting of alcohol and water such that the alkylene oxide reacts with halogens present in the polyolefin to form an alkylene halohydrin, and the alkylene halohydrin is then removed from the polyolefin thereby reducing the halogen content of the polyolefin, the improvement which comprises regenerating the alkylene oxide by contacting the alkylene halohydrin with a hydroxide caustic solution of said solvent at temperature of from about 90° F. (32° C.) to about 160° F. (71° C.), wherein the concentration of the caustic is from about 0.001 N to about 1 N, and recovering alkylene oxide formed by the reaction of the alkylene halohydrin and the caustic solution.

2. The method as described in claim 1 wherein the caustic concentration is 0.01 N to 0.1 N.

3. The method as described in claim 1 wherein the alkylene oxide is selected from the group consisting of ethylene oxide and propylene oxide.

4. The method as described in claim 1 wherein the caustic is selected from the group consisting of potassium hydroxide, sodium hydroxide, and calcium hydroxide.

5. The method as described in claim 1 wherein the polyolefin is polypropylene.

6. The method as described in claim 1 wherein the inert gas is nitrogen.

* * * * *